United States Patent
Beringer et al.

(10) Patent No.: US 8,527,313 B2
(45) Date of Patent: Sep. 3, 2013

(54) DOCUMENT INSTANTIATION TRIGGERING A BUSINESS ACTION

(75) Inventors: Joerg Beringer, Los Altos, CA (US); Eric R. B. Wood, Menlo Park, CA (US)

(73) Assignee: SAP AG, Walldorf (DE)

( * ) Notice: Subject to any disclaimer, the term of this patent is extended or adjusted under 35 U.S.C. 154(b) by 1228 days.

(21) Appl. No.: 11/803,831

(22) Filed: May 15, 2007

(65) Prior Publication Data

US 2007/0288258 A1    Dec. 13, 2007

Related U.S. Application Data

(60) Provisional application No. 60/800,920, filed on May 15, 2006.

(51) Int. Cl.
*G06Q 10/00* (2012.01)

(52) U.S. Cl.
USPC ........................................ 705/7.12; 705/7.23

(58) Field of Classification Search
USPC .............................................. 705/7.11–7.42
See application file for complete search history.

(56) References Cited

U.S. PATENT DOCUMENTS

| | | | |
|---|---|---|---|
| 5,754,857 A | | 5/1998 | Gadol |
| 5,826,239 A | | 10/1998 | Du et al. |
| 6,209,004 B1 * | | 3/2001 | Taylor ........................... 715/236 |
| 6,434,628 B1 | | 8/2002 | Bowman-Amuah |
| 6,973,618 B2 * | | 12/2005 | Shaughnessy et al. ....... 715/239 |
| 6,988,272 B1 | | 1/2006 | Iwao et al. |
| 7,096,222 B2 | | 8/2006 | Kern et al. |
| 7,167,844 B1 * | | 1/2007 | Leong et al. .................... 705/80 |
| 7,219,107 B2 | | 5/2007 | Beringer |
| 7,412,658 B2 | | 8/2008 | Gilboa |
| 7,425,582 B2 | | 9/2008 | Baran, Jr. et al. |
| 7,451,152 B2 | | 11/2008 | Kraft et al. |
| 7,962,498 B2 * | | 6/2011 | Bechmann ..................... 707/756 |
| 2002/0107752 A1 * | | 8/2002 | Rivera et al. .................... 705/26 |
| 2003/0023472 A1 * | | 1/2003 | Lee et al. .......................... 705/8 |
| 2003/0036925 A1 * | | 2/2003 | Miller ............................... 705/2 |
| 2003/0046639 A1 * | | 3/2003 | Fai et al. ........................ 715/513 |
| 2003/0172343 A1 * | | 9/2003 | Leymaster et al. ........... 715/500 |
| 2003/0217333 A1 | | 11/2003 | Smith et al. |
| 2004/0225571 A1 * | | 11/2004 | Urali ............................... 705/26 |
| 2004/0236858 A1 * | | 11/2004 | Schwartz ...................... 709/230 |
| 2004/0261017 A1 * | | 12/2004 | Perry ............................ 715/513 |
| 2005/0027544 A1 * | | 2/2005 | Newstead et al. ................. 705/1 |
| 2005/0203757 A1 | | 9/2005 | Lei et al. |

(Continued)

OTHER PUBLICATIONS

Non-Final Office Action for U.S. Appl. No. 11/803,760 Mailed Dec. 7, 2010, 24 Pages.

(Continued)

*Primary Examiner* — Thomas L Mansfield, Jr.
*Assistant Examiner* — Sujay Koneru
(74) *Attorney, Agent, or Firm* — Blakely Sokoloff Taylor & Zafman LLP

(57) ABSTRACT

Methods and apparatuses enable triggering a work action from instantiation of a document. A system identifies instantiation of a document that has an associated business scenario. Based on the business scenario, a work action or activity as part of an stand-alone workflow is generated to accomplish the work of the business scenario. In one embodiment, a workflow is generated that includes multiple actions, including actions that may be performed by users other than a user that instantiated the document. In one embodiment, the workflow generated is a distributed workflow generated from reusable workflow building block components.

20 Claims, 3 Drawing Sheets

(56) References Cited

U.S. PATENT DOCUMENTS

| | | | |
|---|---|---|---|
| 2005/0257139 A1* | 11/2005 | Burst et al. | 715/513 |
| 2006/0085245 A1* | 4/2006 | Takatsuka et al. | 705/9 |
| 2006/0101321 A1* | 5/2006 | Friedrichowitz et al. | 715/500 |
| 2006/0133412 A1 | 6/2006 | Callaghan | |
| 2006/0149743 A1 | 7/2006 | Mouline et al. | |
| 2006/0190544 A1* | 8/2006 | Chikirivao et al. | 709/206 |
| 2006/0200792 A1 | 9/2006 | Hagstrom et al. | |
| 2006/0224432 A1* | 10/2006 | Li | 705/9 |
| 2006/0247965 A1* | 11/2006 | Griffith et al. | 705/9 |
| 2006/0277089 A1* | 12/2006 | Hubbard et al. | 705/9 |
| 2007/0033194 A1 | 2/2007 | Srinivas et al. | |
| 2007/0033571 A1 | 2/2007 | Moore et al. | |
| 2007/0054627 A1* | 3/2007 | Wormald | 455/70 |
| 2007/0055560 A1* | 3/2007 | Quinn, Jr. | 705/8 |
| 2007/0150480 A1* | 6/2007 | Hwang et al. | 707/10 |
| 2007/0239503 A1 | 10/2007 | Bhatnagar et al. | |
| 2007/0300185 A1 | 12/2007 | MacBeth et al. | |
| 2008/0215757 A1 | 9/2008 | Hellstrom | |
| 2009/0083058 A1 | 3/2009 | Beringer et al. | |
| 2009/0260022 A1 | 10/2009 | Louch et al. | |

OTHER PUBLICATIONS

Non-Final Office Action for U.S. Appl. No. 11/803,751, Mailed Mar. 15, 2011, 11 pages.

Final Office Action for U.S. Appl. No. 11/803,760, Mailed Apr. 1, 2011, 26 pages.

Fingar, "Missing Link", bpminstitute.org, (Jan. 5, 2006).

Fingar, "The Coming IT Flip Flop: And the Emergence of Human Interaction Management Systems", BPTrends, (Nov. 2005).

Harrison-Broninski, "Human Interaction: The Missing Link in BPM (Part I)", ebizQ.net, (Apr. 3, 2005).

Harrison-Broninski, "Human Interaction: The Missing Link in BPM (Part II)", ebizQ.net, (Apr. 10, 2005).

Hollingsworth, David, "Workflow Management Coalition The Workflow Reference Model", Document No. TC00-1003, Document Status—Issue 1.1, Jan. 19, 1995, 55 Pages.

Non-Final Office Action for U.S. Appl. No. 11/956,086 Mailed Jun. 8, 2010, 19 Pages.

Final Office Action for U.S. Appl. No. 11/956,086 Mailed Nov. 24, 2010, 26 Pages.

Non-Final Office Action for U.S. Appl. No. 12/033,361, Mailed Feb. 17, 2011, 13 pages.

Non-Final Office Action for U.S. Appl. No. 11/803,760, Mailed Jul. 20, 2011, 26 pages.

Final Office Action for U.S. Appl. No. 12/033,361, Mailed Aug. 3, 2011, 7 pages.

Final Office Action for U.S. Appl. No. 11/803,751, Mailed Aug. 17, 2011, 16 pages.

Notice of Allowance for U.S. Appl. No. 12/033,361, Mailed Oct. 27, 2011.

Final Office Action for U.S. Appl. No. 11/803,760, Mailed Oct. 31, 2011.

* cited by examiner

DOCUMENT INSTANTIATION TRIGGERING A BUSINESS ACTION

This U.S. Patent application claims priority to U.S. Provisional Patent application No. 60/800,920 filed May 15, 2006.

FIELD

Embodiments of the invention relate to business processes, and more particularly to triggering a business action via instantiation of a work document.

BACKGROUND

Work within an enterprise or company is frequently performed within the framework of a business process or a workflow having a business objective. The workflow traditionally has multiple phases or states, where a business activity is required for each state. Frequently as part of a workflow, a user creates a document as part of fulfilling a work task. In addition to creating the document, the user traditionally was required to perform additional work tasks to begin an activity related to performing the work for which the document was created. That is, a user would create a document, and then have to initiate a work activity to continue to perform work related to the activity.

Traditional systems include wizards or checklists that can guide a user through a procedure in response to opening a document. There also exist interactive forms, which are fillable forms into which a user can provide information that become part of the document. However, such concepts are traditionally limited to simple procedures related only to the document itself and the information placed in the document. Also, no performance on the part of the enterprise backend is required.

SUMMARY

Methods and apparatuses enable triggering a work action from instantiation of a document. A system identifies instantiation of a document that has an associated business scenario. Based on the business scenario, a work action as part of an stand-alone business activity is generated to accomplish the work of the business scenario. In one embodiment, a workflow is generated that includes multiple actions, including actions that may be performed by users other than a user that instantiated the document. In one embodiment, the workflow generated is a distributed workflow generated from reusable workflow building block components.

In one embodiment, the document is identified as being created from a document template, or from a form document. In one embodiment, the document is identified as being instantiated from an office suite, which may be performed with an office suite business process extension. In one embodiment, a document instantiation identifier in the enterprise backend identifies the document. In one embodiment, the business scenario is identified from metadata related to the document, or metadata or context information related to a project for which the document is created. In one embodiment, a context determiner module identifies the context. In one embodiment, the workflow has work actions related via request-to-perform relationships.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
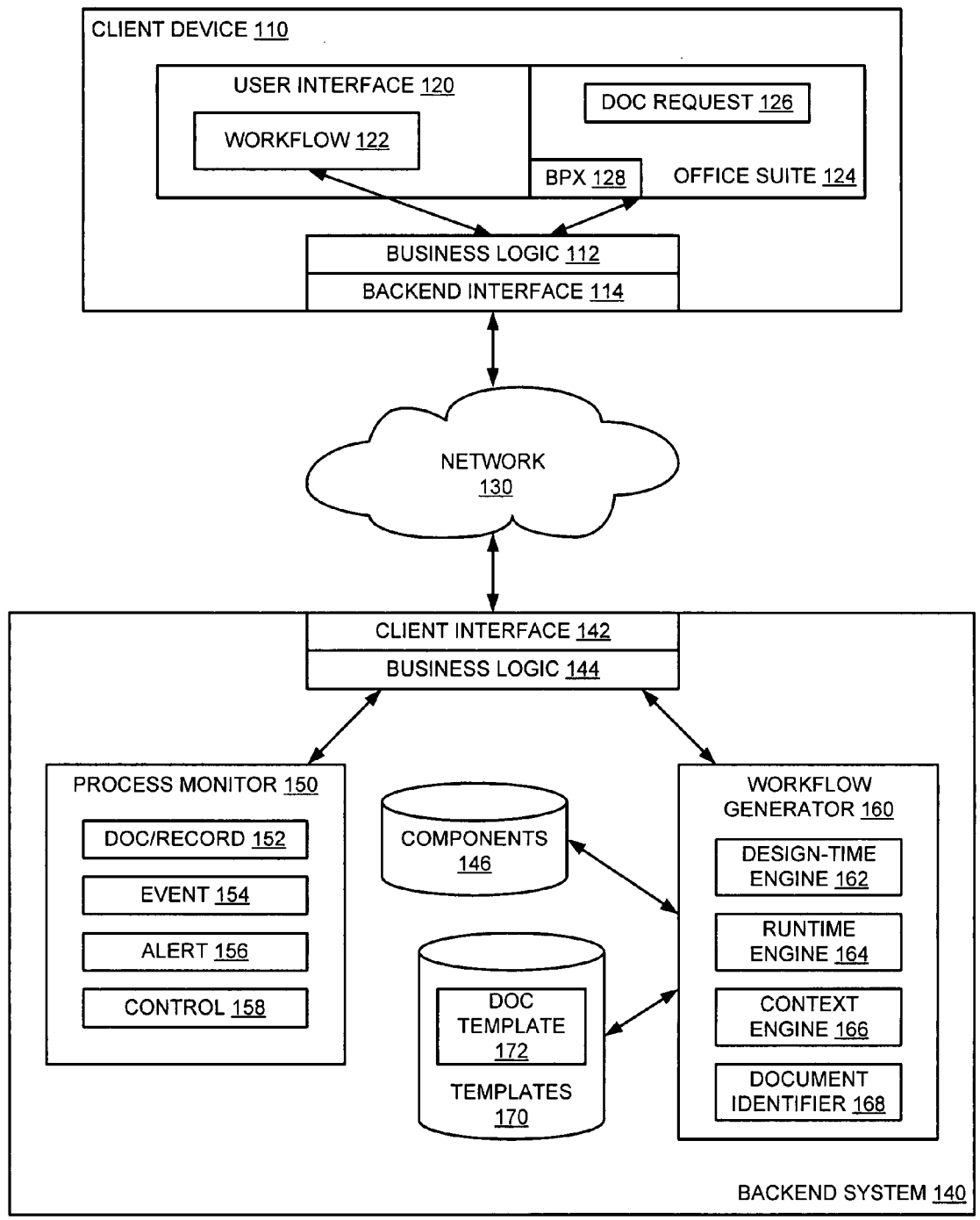
FIG. 1 is a block diagram of an embodiment of a system for generating workflows from reusable components.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Methods and apparatuses enable the starting of a work action via the instantiation of a document. Thus, a user can begin a document having a particular context or work significance, and the opening of the document will generate one or more work actions for the user to perform that are related to the document. The opening or instantiating a document could also trigger a work scenario, which provides a context and resources for a work action or a workflow. Thus, different systems do not need to be opened in order to initiate a workflow—it can be opened as a result of instantiating a document that is related to the desired workflow.

An enterprise system can automatically instantiate business scenarios by instantiating office documents based on templates that are associated with a business goal. For example, the business goal may include planning a budget, defining a strategy, reviewing an employee, etc., each of which may have specific template documents associated with the business scenario. The instantion of such documents within the enterprise can indicate to the enterprise system that a business process is to be executed. Rather than merely having the documents instantiated as documents, the documents become resources in the larger context of the business scenario. The system can then pull up the proper scenario model to coordinate the required activities associated with a workflow for the business scenario. Examples of document instantiation includes creating a MICROSOFT WORD or EXCEL document, an OPENOFFICE document, etc. Note that Microsoft as well as Word and Excel are trademarks of Microsoft Corporation of Redmond, Wash. OpenOffice is a trademark of SUN MICROSYSTEMS, INC., of Santa Clara, Calif. etc. Other office suite solutions exist that could similarly trigger a business action as described herein. All trademarks are the property of their respective owners, and are used herein solely for purposes of identification.

A system overview is provided below, followed by a more detailed description of business action creation via instantiating a document. The overview provides an introduction to terms as well as describing an overall system in which document instantiation can be enabled to trigger a business action.

A system can generate distributed workflows that couple human activities with a business scenario, and relate activities to each other with request-to-perform (RTP) relationships. The workflow management environment provides tools to create a workflow in a manner consistent with the way in which people do work, providing a layout of the workflow from the perspective of actions, resources, or even conversations that make up a workflow or a portion of a workflow. Workflows are generated from modular components, which are related to one another via relationships that can map their place in the workflow (e.g., one activity is performed prior to another activity, or the occurrence of one input to a conversation leads to another input in the conversation, etc.). The various components of the workflow can be associated together through a workflow management environment, and a workflow created which maps the various actions or sub-portions of a workflow. Various aspects of the workflow can also be represented and monitored with the management environment using the same mapping and relationship tools.

The actions of the workflows are associated with a business scenario or a business process. The RTP relationships enable management of distributed activities that are part of the workflow. The actions and activities are modeled components, where the model defines the actions and activities in a way the system can manage. The modeled actions define resources related to a business activity. The individual activities can be instantiated and related with RTP relationships to result in a workflow that can be generated and managed by the enterprise system. Interactions between users can be captured within the system as part of the workflow, and represented in the workflow management environment.

Traditional transactional applications and ERP-centric workflow models are not technologically equipped to support enterprise services architecture (ESA) or multi-channel, multi-modal occasionally connected (OCA) user experience. Traditional workflow only works for very simple tasks such as: "provide an approval," after which the system can continue to execute the workflow. When tasks are more complex, which is increasingly common, the additional actions a user performs to "complete" the task are not traditionally part of the workflow model.

With ESA, business applications are close to a bundle of resources than a monolithic transaction or application. Thus, workflow that focuses on transactions rather than services and resources results in inefficiencies. In contrast to traditional monolithic transaction-based workflows, enterprise services can be composed into granular user actions that serve as reusable building blocks when modeling activities within a distributed workflow. Rather than writing an application, the developer generates short process descriptions and attaches available services and business actions to the process description. An activity within the distributed workflow model is created by assembling actions together. Workflow can be represented by any of the reusable building blocks, such as the actions, resources (documents, services, etc.), or the interactions between people).

In one embodiment, the distributed activity management can be considered to have two components: a service-oriented Activity Model that defines a relationship of an activity to a business scenario; and, an Event Model that defines an RTP relationship between activities. The Activity Model allows actions to be generated as components or building blocks that can define individual actions or operations that will be performed by a user in the context of an activity. The activity can have an extended context describing typical performers, preconditions, required resources, core actions, related information, related resources, accept and declare options, business rules, task classification, etc., which can be dynamically assigned to an individual action and related to the business scenario. The distributed Activity Model describes business processes by means of definitions or descriptions that couple activity-centric contexts that are connected to a Scenario that serves a specific business intent. The Event Model defines events as requests-to-perform (RTPs). In one embodiment, the Event Model includes annotations (e.g., metadata) that identify a work Requester and a work Performer in any transaction.

The Event Model further supports ad-hoc conversations and acceptance terms among the Requester and Performer. That is, collaboration between the Requester and Performer can become part of the model from which workflows are created. The Event Model allows building an ad hoc coordination between the requester and the performer. The ad hoc coordination can reduce the complexity of flow models while still allowing for typical ad hoc conditions of state transition in the workflow based on negotiation between the requester and performer. Thus, state transitions can occur and ownership of activities can transfer within a workflow due to negotiation or other collaboration between requester and performer. The RTP relationship can thus be ad hoc, allowing dynamic activity to be modeled within the system.

By modeling business processes as a collection of loosely coupled individual contributions of individuals, the control structure of the distributed workflow more closely resembles the actual work practice of enterprise users. Such is depicted in the representations of the management environment. In one embodiment, business workflow and person-to-person work procedures are brought together, seeing that the same data model and technology can be used to model fixed workflows (business workflow) as well as distributed workflows by modifying the requester-performer relationship and the conditional actions. The same technology can also be used to handle system or human requests. The same technology can also be used to model simple activities consisting of a single task or complex activities consisting of tasks including sub-activities. Distributed workflows could also be integrated with traditional fixed workflows.

Additionally, distributed workflows allow contextual collaboration in person-to-person work processes. Solutions for human activities can be provided as enterprise solutions to support more flexible and ad-hoc human activities. Procedures that are currently "hidden" within an enterprise could be surfaced and streamlined, and checked for compliance and efficiency. Including people processes into business processes enables the handling of exceptions and less structured work at a system level. Such procedures are "visible" in development through the workflow management environment, and visible to the system in that assignments are made that allow the procedures to be created on a system level and monitored.

Thus, distributed activity management provides a model-driven workflow using a request-perform control structure that puts distributed collaborative activities into a coherent context related to a business goal. The distributed activity model describes business processes by means of loosely coupled activity-centric context models, and connects such models to scenarios that serve a specific business intent.

According to the teachings herein, an enterprise system can model a business process on multiple layers. In one embodiment, a business process is modeled on three layers: Scenario, Activity (task), and Action. A scenario layer exists on a first level, where a developer lays out the activities of users, and connects activities of one or several users through an event-driven control flow, such as RTP relationships. Thus, in one embodiment, every activity has a requester and a performer. Requests can be simply accepted and acted on, or the performer can ask for additional details or enter negotiations with the requester. The scenario description may include a role description for the performer of an activity that profiles the performer with respect to skills, organizational role, relationships to other performers, or simply the name of the user. The role definition facilitates the scenario and a resulting business process to be dynamic. Rather than inputting a particular person into the business process, the business process can be defined in terms of a role, or a "type" of person that can/should perform a particular action. When the business process is instantiated, the system can place an actual person into the workflow.

Scenarios are composed by defining activity blocks, assigning them to process roles, and linking them through requests. Each activity is triggered by a request, which may be either a system event or human request. Resources from the scenario context are handed over to activities as required resources. As used herein, resources refer to elements that may be used to perform a work action. Examples may include a business object (a vendor, an invoice), a document (a statement of work (SOW)), an interactive form (ISO certification questionnaire), people, a report, etc. Ad-hoc conversations between requester and performer are supported and optionally captured as a conversation thread.

An Activity Model within a scenario is modeled as a separate entity describing an actionable context interfacing with the scenario via events. A request event triggers an activity that models personal contributions in the form of a context description that defines potential actions, resources, rules, and related information associated with the activity. The activity may also include requests to other contributors to perform certain activities. An activity can further be split into separate actions that accomplish a task. As used herein, a task refers to a phase of a workflow. A task is some work or action (which could be an Action as described below), or something to do or accomplish. Tasks may be the subject of requests. An activity block is a collection of actions, information, and related resources that one user needs to accomplish the requested task. Each activity block may provide guidance for individual performers in terms of what actions to perform, and the checking of preconditions, required resources, and business rules. Each activity can be enriched to offer related information and actions. The system can also model activities recursively, so that a request within one activity can trigger sub-activities or entire new work situations (scenarios).

An Action is a reusable atomic building block for meaningful business acts. An action provides a high-level enterprise service that encapsulates services and a user interface (UI). In one embodiment, actions provide a plug-and-execute interface to the activity context. In one embodiment, an action is a non-transactional view of a work item. Actions can provide the UI for supporting user interaction. Actions as reusable building blocks can be used to construct complex activities of a distributed workflow. Actions are connected to the enterprise backend (ESA), and may contain embedded navigation (e.g., object links, multiple screens such as guided activities). Examples of actions might be: Post Message, Create PO, Approve Vendor, View Supplier Details, View 360 supplier review, Create Vendor Record, Request Missing Document, Choose Between Candidates, Evaluate Candidate, Submit Application, Set New Salary, Promote Employee, Create Invoice, etc., or anything that can be perceived as an atomic work action from a business perspective or atomic enterprise business work activity. Thus, actions will likely be different in different implementations, seeing that different enterprises/organizations may view the atomic level of actions differently.

To capture, generate, and execute distributed workflows, the enterprise system includes design-time and runtime components. Details of each are described below. Regarding design-time components, simplified design times enable business experts to model scenarios and activities. Scenarios that already exist within an enterprise can serve as templates for new processes. Reusable actions enable business experts to configure an activity without implementing any service or UI. The design-time components are embodied in a design-time engine, which may include separate components (e.g., separate modules), or may include the functionality of each of the below. In one embodiment, a Process Map diagram tool or function is used to lay out processes.

The Process Map diagram is an example of the workflow management environment as discussed herein. Such a process map diagram lays out roles across "swim lanes," and displays activities and their associated requests along those swim lanes. The swim lane provides a simple mechanism for creating the process, which is then converted by the system into a workflow. The visual components of the swim lanes each represent services or business objects that can be combined in a workflow or workflow application. More detail with regard to a Process Map diagram can be found in co-pending U.S. patent application Ser. No. 11/803,751, entitled, "Business Process Map Management," filed concurrently herewith, and assigned to the same corporate assignee. Such a process map diagram lays out roles across "swim lanes," and displays activities and their associated requests along those swim lanes. The swim lane provides a simple mechanism for orchestrating the activities of multiple performers, and then converting them by the system into a distributed workflow model. To include system generated events and activities, a swim lane can also represent services or business objects that are controlled by system applications and workflows.

In one embodiment, the design-time engine includes or embodies an Activity Composer, which can be used to compose all actions required to accomplish an activity. Activities and actions can be enriched with contextual information. The Process Map can be used to link activities from several people via RTP events. The Activity Composer can be used to model individual activities. This clear distinction helps business experts to focus on either the process scenario level or the personal task flow level. The Activity Composer allows a designer to pull together specific services into the activity to enable a user to perform actions via the services.

In one embodiment, the design-time engine includes or embodies an Activity Broker that determine whether a particular action can be displayed/accessed via a particular device, and if so, in what mode. The Activity Broker can enable support for multi-channel and OCA runtimes. The information about modes and channels can be provided directly in the activity through metadata or activity parameters.

In one embodiment, activities and actions are annotated. For example, activities can be annotated with respect to task complexity on a scale from problem solving to simple approval. Actions can be annotated with respect to UI requirements such as needs a large (relatively) display or, can be done via voice. Actions can also be annotated with respect to availability of service, for example, real-time, offline, OCA. Together with personal preferences these annotations allow for smart dispatching, previewing, and execution of activities in multiple devices. Such annotations can exist via metadata associated with the activity and/or action. Such annotations can also be accessible via the Process Map layout.

Regarding the runtime components, the runtime can be generally considered to be provided by a runtime engine, which includes various components (e.g., modules) or embodies the functionality. The runtime provides progressive access to business context and functions of the distributed workflow. Requests can be managed on any device. Users (users) can preview activities by checking the existence of required resources, and the fulfillment state of pre-conditions. The users can preview their own activities by looking into the list of modeled actions of an activity. The execution of one of those actions, or the viewing of resources and related information depends on the device capabilities and the match of task complexity to current mental load of the user. The current mental load of the user can be inferred or derived by context-awareness based on device, location, and work situation.

Returning to document instantiation triggering a work action, working in a document can trigger appropriate related business scenario models or follow up actions. Such automatic triggering of the related business scenarios enables a user to efficiently progress with other work in the scenario. Note that with the integration of document instantiation into the workflow intelligence of an enterprise system, document-centric users can more easily manage activities by auto-instantiating business activities needed to accomplish one or more tasks associated with a generated document.

In one embodiment, when a user opens an office suite document, the opening of the document also starts an action or activity that is tied into the backend. The document becomes a resource of an activity. The concept of triggering a work action from a document resource allows a user to implicitly create something for an activity by doing natural work, or doing work in the natural manner work is accomplished. Instead of just associating everything to the document, the document becomes part of a larger context. Note the distinction presented. Rather than having workflows and activities and resources, each of which must traditionally be related to a document to relate the document to the workflow, instead the system generates a work activity with the document as a resource of the workflow.

Triggering an action from a document creation can be enabled through a connection between a backend (enterprise) system with the user desktop. For example, the connection can be through one or more extensions to the office suite. Extensions can be similar to those described in co-pending U.S. patent application Ser. No. 11/350,294, entitled, "Business Process Extension for Productivity Suite Application," filed, Feb. 7, 2006. That Application makes specific reference to groupware, but similar mechanisms can be provided to extend the functionality of an office suite into the backend from applications not traditionally considered "groupware." Specifically described is the following, which could be applied to applications other than those traditionally considered groupware.

The extensions provided to the groupware client can enable integration of business process tasks into the environment of the groupware client (or an application with which the groupware client is associated). A participant in a workflow may be able to generate a workflow, receive status or other information regarding one or more tasks of a workflow, and/or process or execute a task of a workflow. A groupware client can access data objects, forms, functions, services, data structures, and/or processes through enterprise-interface extensions (e.g., via services), to access items that exist or are managed in a business backend system. The business backend system includes logic and services to manage and control the data and processes. The business backend can be provided with extensions (as needed) to enable the groupware client to access the backend services. In one embodiment, an intermediate manager or server is provided to enable access from the groupware client to backend enterprise services.

The integration of access to business process tasks enables the workflow participant to act on contextual information (e.g., reports, documents, hints, data, etc.) locally from within a groupware application. The user interface of a groupware application is likely to be familiar to the workflow participant, and may allow the integration of tools of the groupware application (e.g., spellchecking, translations, etc.) into the performance of the workflow task. The workflow participant can interact (e.g., create, process, track, set preferences, etc.) with a workflow through the familiar user interface of the groupware client or associated application.

In contrast to the integrated use of groupware with a workflow as described herein, current email notifications or other traditional functions of groupware focus only on a single task or action with respect to the workflow. With the integration of groupware functionality and enterprise access, the business process information associated with a workflow presented in the groupware application is persisted with the integrated groupware client. For purposes of simplicity in description, use of the term "groupware client" may refer to the groupware client and/or its associated groupware application(s). Persisting the information refers to making the information available to the workflow participant either continuously, or upon request, and from within the context of the groupware client. For example, status information may be provided to the groupware client to provide updated information for the business process within the groupware client. Also, or in the alternative, status information could be accessible, for example, when the workflow participant selects an item/icon or executes an action within the groupware client. Persisting the information may include storing the information locally to the groupware client, or within a storage location within a groupware server, in addition to storing the information within the enterprise backend.

The mechanisms as described herein can be considered similar in that a backend system and a front-end office suite have correlated logic. That is, actions in one or the other of the front-end or backend may cause action in the other. Extensions in the office suite can enable integration of the backend enterprise system resources into the office suite. Specifically as described, the creation of a document can generate a business action through the models described herein, and the document is provided as a central resource of the action. Actions can thus be document-centric, much as would normally be expected in a natural work environment.

FIG. 1 is a block diagram of an embodiment of a system for generating workflows from reusable components. System 100 includes client device 110 and backend system 140. Client device 110 represents any of a number of devices with which a user may interface with a workflow. Examples include, but are not limited to, desktop computers, laptop computers, mobile phones, handheld wireless devices, etc. Client device 110 includes user interface 120, which represents one or more input and output components that enable a user to interact with an item represented in the UI. Physical UI components may include touchscreens, displays, keypads, etc., supported by drivers, rendering engines, etc. As used herein, UI may refer to the combination of physical and software components. In one embodiment, UI 120 is able to represent workflows, such as workflow 122 within system 100. Note that system 100 may support both fixed and distributed workflows. As mentioned above, workflows that are traditionally fixed can be generated with the same technology used to generate distributed workflows. Additionally, distributed workflows can be generated that model business processes not previously available in enterprise systems.

Workflow 122 is a representation of a bundle of enterprise resources, such as document or business object resources, as well as enterprise services that enable access to backend functionality and enterprise business objects. In one embodiment, at least a portion of the functionality presented via distributed workflow 122 is enabled via business logic on the enterprise system (business logic 144). Additionally, client device 110 may include business logic 112 that provides connection functionality and enables use of the services from client device 110. In one embodiment, business logic 112 represents runtime components that may be executed from client device 110. Other runtime components are executed in backend system 140, and may be represented by business logic 144.

UI 120 also represents/displays office suite 124, which executes from memory within client device 110. Office suite 124 represents any type of business productivity application, such as document generation/editing applications, spreadsheet applications, email clients, etc. Within office suite 124, a user can generate document (doc) request 126. The document can be any type of document, based on what application of the office suite is being executed. Document request 126 is a request to instantiate the document, for example, from a template or form. As referred to herein, a template refers to a document having standard formatting or framework in which a user can operate. A form refers to a document having fillable or editable fields into which information can be provided. In certain places herein, the term "template" may collectively refer to either a template as stated above, or a form. In many implementations, there may be little distinction between a template and form.

Office suite 124 includes BPX (business process extension) 128. BPX 128 refers to any of a number of modules, business logic, library links, or other extensions that can be added to office suite 124 to enable office suite 124 to access backend system 140. In one embodiment, document request 126 triggers an operation in backend system 140 to instantiate a document from document (doc) template 172 of templates 170. In such a case, context engine 166 of workflow generator may detect the instantiation of the document. Likewise, runtime engine 164 may include another component that is capable of identifying the instantiation of the document. Alternatively, document identifier 168 may represent a component that detects instantiation of documents within backend system 140. In response to detecting the instantiation of the document, context engine 166 can identify context of the document instantiation. Workflow generator 160 may then generate a work action or workflow to be performed.

Client device 110 includes backend interface 114, which may be a general-purpose network connection device, such as a network interface card, a wireless (e.g., WLAN) or cellular circuit, etc. Backend interface 114 connects to backend system 140 via network 130, which represents any type of network or combination of networks. For example, network 130 may be a wired local area network (LAN), a wireless LAN (WLAN), a cellular communications system, etc. Backend system 140 is coupled to network 130 via client interface 142, which enables backend system 140 to interface with client devices including sending and receiving information related to workflows. Network 130 also enables document instantiation and the passing of context information.

Backend system 140 represents one or more enterprise servers, databases, etc. In one embodiment, backend system 140 includes process monitor 150, which represents one or more modules or components that manage workflows. Process monitor 150 may include, for example, modules for generating or storing a document or record 152, for producing an event 154, for generating a system alert 156, and for generating a system control 158. Record 152 represents any type of system storage of a task. The storage may be in the form of data in a field of a database, a document, a file, etc. Event 154 represents system operations that may take place as a result of work on a workflow activity. Events may include anything from scheduling to shipping to generating a task for another user. Alert 156 represents a mechanism within backend system 140 that can provide information to one or more users regarding a workflow or an action of a workflow. Alerts can be produced on a schedule (e.g., daily, weekly), as well as occurring when an action occurs, when a state change happens, etc. Control 158 represents any other type of control, system signal, command, error, etc., which may be generated by backend system 140 via process monitor 150 in response to something happening or not happening (that should be happening) on a workflow.

Backend system 140 also includes workflow generator 160, which represents components that generate workflows or work actions. Workflows as described herein include various aspects—design-time components include templates and building blocks that represent the workflow and its constituent elements (e.g., actions, resources, etc.); runtime components include instantiated versions of the templates and building blocks in a workflow for execution; and, distributed workflows as described herein include context, which relates to a business scenario to which the workflow components are related. Components 146 represent the building block components used to generate a workflow, such as actions or activities. Templates 170 represent other building blocks, and may include associations or relationships that relate one or more actions or activities to a context. In one embodiment, templates 170 cannot exist without context; thus, templates 170 can be considered to include context that defines relationships between components 170. In one embodiment, document template 172 has an associated metadata file (that may be stored in templates 170 or another database) that can indicate a relationship between document template 172 and one or more business scenarios. In the case of multiple business scenarios being associated with document template 172, a user can explicitly select which context (e.g., which business context, project, client, etc.) is intended for the document. Alternatively, a project, user (e.g., via preferences), client, or other context information can be provided or ascertained by context engine 166 to determine what context to apply to document template 172. Thus, the resulting document can be instantiated in a particular context, and the instantiation may trigger a work action related to or connected to the document, with the document becoming a key resource for the work action. In one embodiment, a document template can trigger a business scenario for which a workflow is generated, and not just a work action or the workflow itself.

Design-time engine 162 represents one or more modules that enable generation of a workflow and/or its constituent elements. In one embodiment, design-time engine 162 includes modules necessary to provide a development environment in which a developer can generate actions, activities, context (business process or scenario) descriptions, templates, relationships (which may include RTP relationships), resource associations, etc. Such are considered the constituent elements of a workflow. Once developed or generated, these elements can be stored in one or more databases, represented as components 146 and templates 170, which are available to instantiate a workflow. In one embodiment, design-time engine 162 includes a workflow management environment as described herein. Thus, design-time engine 162 can lay out process components according to the flow of business, linking activities, resources, and people to a business scenario to generate or manage a workflow. Conversations or interactions can be provided as part of a design of a business process or as part of a management of a running process.

Runtime engine 164 represents one or more modules that enable runtime generation of a workflow. Note that certain templates or components as defined in design-time may be defined based on a business role, rather than based on a specific person. At runtime, the system resolves such dynamic variables and assigns actual values to the dynamic template or generic values of the templates. Runtime engine 164 enables the system to create a workflow specific to a given situation or function, referred to as a business context. Runtime engine 164 either includes context engine 166 or works in conjunction with context engine 166 to determine the context of a workflow to be generated. Context engine 166 can determine the context via annotations such as metadata or system-level descriptions, or from other sources, as described above. In one embodiment, the context is determined from an input, such as a request, a document, etc. Context determiner 166 may be part of business logic 112, or have one or more components or interfaces in business logic 112 that enable context to be determined for office suite 124. Runtime engine 164 may be enabled by business logic 144 of backend system 140 and/or via business logic 112 of client device 110. Thus, business logic may include elements of a runtime engine necessary to receive workflow components and render them as a workflow.

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 2:
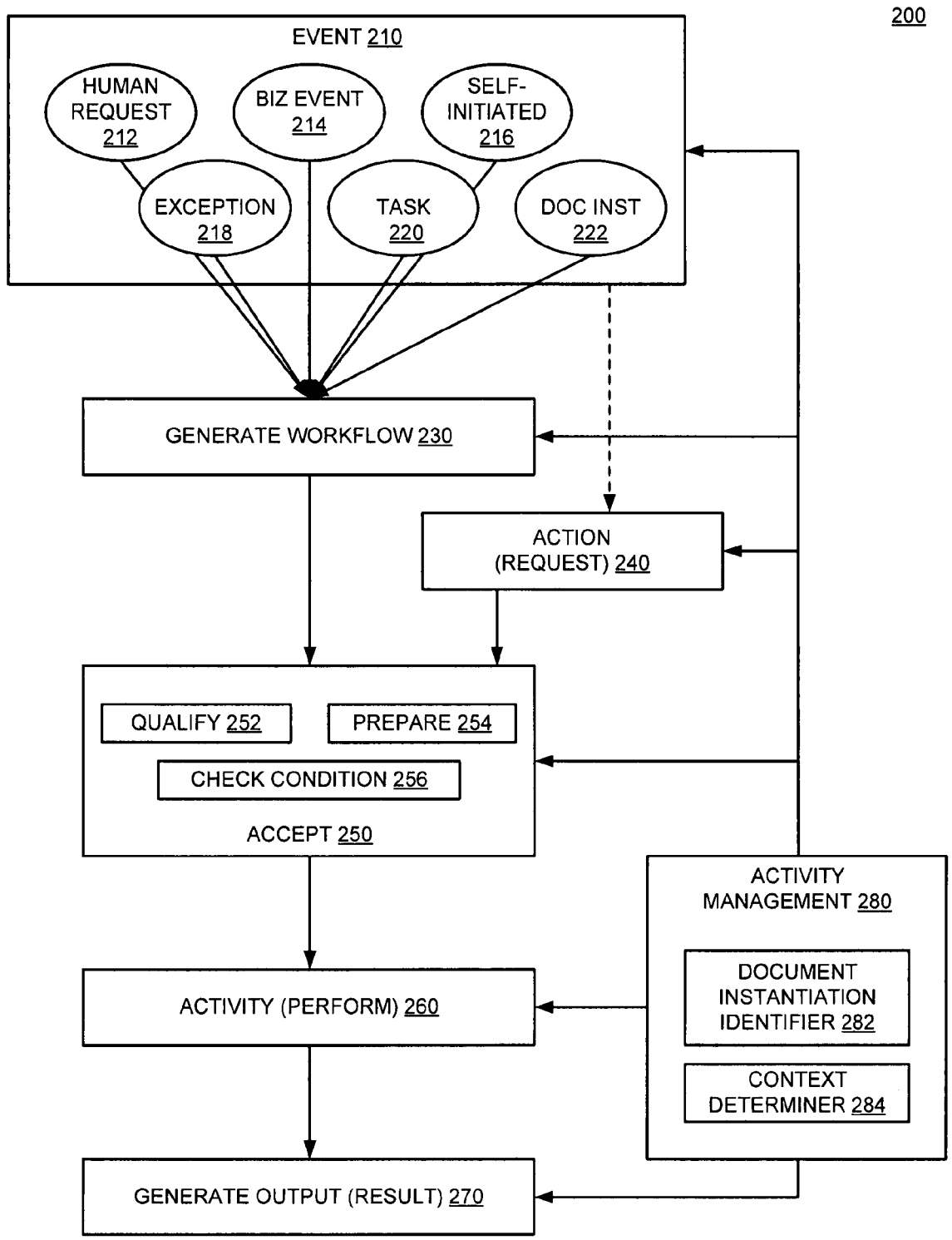
FIG. 2 is a block diagram of an embodiment of a system with an activity management entity that monitors activities generated with a request-to-perform control.

FIG. 2 is a block diagram of an embodiment of a system with an activity management entity that monitors activities generated with a request-to-perform control. System 200 represents an enterprise system according to any embodiment described herein. Specifically in system 200, various components or modules related to events, requests, and actions are described. Event 210 represents a request, which triggers a work action or a workflow. Event 210 can be any type of event, and thus, any type of event can be a trigger for a work action or workflow. Examples of events include human request 212, business event 214, self-initiated event 216, exception 218, task 220, and document instantiation (doc inst) 222. Each illustrated event is intended to be understood in a broad sense, viewed categorically rather than narrowly.

Human request 212 represents requests from other users, for example, as part of a workflow, or as the initiation of a workflow. That is, one user may generate a request of another as part of a distributed workflow. Also, a person (e.g., a supervisor) may request that a particular type of work be accomplished, which could initiate a workflow to accomplish the work. Human request can be received via email, invitations generated from software programs, calendaring, generating a task, etc.

Business event 214 represents any type of occurrence that may take place in a business environment. Examples may include a workflow action that is generated as a result of work completed on a production line, an action generated in response to an online order being placed, etc. Business event 214 may trigger a particular business scenario that generates a workflow, or may provide context that is used in generating a workflow.

Self-initiated event 216 represents an activity or a task generated by a user him- or herself. Self-initiated event 216 can be the same as most or any human request 212, but rather than coming from someone else, they are generated by the user that will perform the task. That is, the user is both the requester and the performer in the RTP relationship for that activity.

Exception 218 represents any of a number of exceptions that may be triggered in the flow of business. For example, a customer support call may trigger an exception when circumstances warrant providing additional service to the customer, or if the customer becomes particularly uncooperative or upset. Additional examples may include a shutdown or error occurring on the production line, or a disruption to the normal supply chain.

Task 220 represents any other type of event trigger not mentioned already. Task 220 may also be a task of a workflow that generates/triggers another task. For example, workflows move from one task to another, and the transition from one task to the next can operate as an event that triggers a new task.

Document instantiation 222 represents any event that triggers a work action or workflow of a business process. Document instantiation 222 can operate to begin a business process or generate a task of a business process, automatically. The document that is opened triggers an action or activity and becomes a resource for the performance of the action. Thus, workflow can be document (or resource)-centric, instead of merely being centered on transactional phases of a workflow, as with traditional ERP workflow.

In one embodiment, occurrence of event 210 triggers the generation of a workflow, as shown in block 230. In one embodiment, occurrence of event 210 can generate an action request, as shown in block 240. That is, an event may trigger a work action, or many related work action. Multiple related work actions can be understood as a workflow. Thus, events such as document instantiation 222 can trigger a work action, a part of a workflow, or an entire workflow.

The action or workflow acts as a request to a user or system receiving the action or workflow. The request is accepted via accept block 250. In one embodiment, certain functions are performed as part of acceptance of event 210. For example, accept 250 may include qualify 252, prepare 254, and/or check condition 256. Qualify 252 refers to specifying the activity required for the request. In one embodiment, negotiation is allowed between the performer receiving the request and the requester. Thus, qualify 252 may also represent the negotiation of terms of the request between the requester and performer. Prepare 254 represents any preparation that is necessary for the activity. Preparation may include obtaining resources, calendaring time, etc. Check condition 256 represents any of a number of verifications that can be performed on the request. For example, conditions for timing conflicts can be checked (e.g., looking at a calendar), making sure that a workload is not too heavy (e.g., too many deadlines within given period of time), etc.

An accepted event is then activity 260. Where event 210 triggers the request, activity 260 represents what will be performed to fulfill the request. Activity 260 can be any of a number of different work tasks, which may range in complexity from performing a simple action, to more complex tasks such as discover problem, understand problem, find resolution, explore solutions, provide information, etc. Note that an activity may include one or more actions, each of which may be modeled. Completing activity 260 will result in an output generated, as illustrated by generate output 270. The output will depend upon the task type, and may be a list, a document, a recommendation, a report, etc.

System 200 includes activity management 280, which represents one or more modules that perform monitoring and other functions with respect to runtime workflows. Activity management 280 can monitor the entire flow of activity from the request (not explicitly shown) to the acceptance, the performance, and the generating the output. Thus, the system can be aware of where a process is, who owns the process, and what is happening with the process. The end result is that processes that have been traditionally hidden from a system level are available via the system for review and status tracking. Additionally, such hidden processes can also be enhanced as system-level resources can be leveraged for generating tasks, checking availability, obtaining resources, etc.

Additionally, in one embodiment, activity management 280 can represent certain runtime components that enable system 200 to identify the instantiation of a document, and trigger an action via the document instantiation. Thus, in one embodiment, activity management 280, which may represent a workflow management environment, may include document instantiation identifier 282 and context determiner 284, or similar modules, or equivalent functionality. Document instantiation identifier 282 represents any of a number of components that can identify that a document has been instantiated. Such identification can be performed at the time of a request for a template from a backend database, for example. Context determiner 284 can identify the source of the document instantiation, and may identify context related to the instantiation, for example, what program generated the request for the document, what type of document is requested, what project the document is request for, what system the user requested the document for (e.g., CRM, ERP), etc. Such context information can then inform the creation of action 240 or workflow 230.

Figure 3:
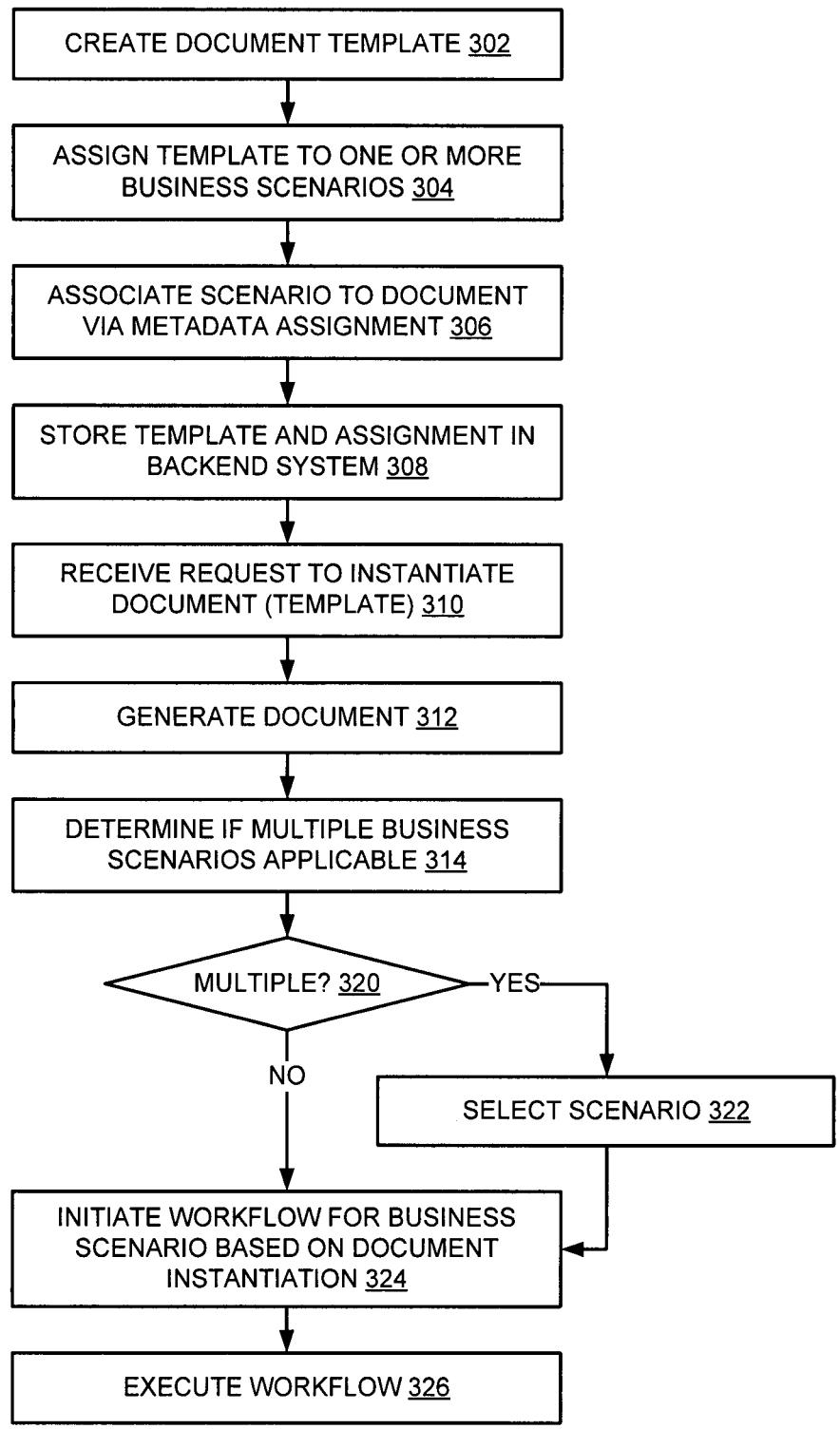
FIG. 3 is a flow diagram of an embodiment of a process for requesting and performing as part of a managed workflow.

FIG. 3 is a flow diagram of an embodiment of a process for requesting and performing as part of a managed workflow. A flow diagram as illustrated herein provides examples of sequences of various process actions. Although shown in a particular sequence or order, unless otherwise specified, the order of the actions can be modified. Thus, the illustrated implementations should be understood only as examples, and the process can be performed in a different order, and some actions may be performed in parallel. Additionally, one or more actions can be omitted in various embodiments of the invention; thus, not all actions are required in every implementation. Other process flows are possible.

A document template is created in an enterprise system, 302. The document template may be created in any manner known in the art. In one embodiment, the document template is assigned to one or more business scenarios to relate the document template to the business scenarios, 304. The relating of the business scenarios can occur via generating a metadata file or description, or through parameters in a data storage, or other means. In one embodiment, the business scenario is associated to the document via assignment of a metadata file to the document template, 306. The template and the assignment are stored in a backend system, 308, such as a template database.

The system receives a request to instantiate the document (template), 310. The request can be made from an office suite application, or from another application. The request can also be made via a user selecting the template from a search or filesystem browsing application. In response to the request, the enterprise system generates the document, 312. The system may then determine if multiple business scenarios are applicable to the document, 314. In one embodiment, the enterprise system only allows a single business scenario association, which would obviate such a determination.

If there are multiple business scenarios applicable to the document, 320, one of the scenarios may be selected to determine a context for the document, 322. The selecting of the business scenario can be initiated via the system, for example, and a request made of the user to identify which scenario is applicable to the instance of the document. Alternatively, the system may be able to determine the applicable business scenario due to a work context (e.g., a project or a workflow action being worked on by the user), or via permissions (e.g., only one is applicable to user rights associated with the user) or preferences set up for the user. If there are not multiple business scenarios applicable to the document, 320, or after selecting the business scenario, 322, the system initiates a workflow or work action for the business scenario based on the document instantiation, 324. Thus, document instantiation triggers the workflow. The system can then manage and execute the workflow as the user (and potentially other users) performs actions applicable to the workflow, 326.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for generating a work action or activity associated with a workflow, comprising:

receiving, from a client device by a server of an enterprise system, a request to open a document in the client device, the document incorporating at least one data object from the enterprise system, the enterprise system including multiple backend systems accessible via at least one frontend interface on the client device;

processing the request with the server, including identifying one of multiple different business scenarios in the enterprise system associated with the document, wherein the document is associated with the business scenario and not the other different business scenarios, the business scenario is defined in reference to resources and services to use to perform work related to a business goal of the business scenario, the resources including the document;

determining in response to the identifying the business scenario, a distributed workflow specific to performing the work related to the business goal of the associated business scenario, the enterprise system including workflow management configured to generate the distributed workflow in response to identifying the business scenario;

initiating the distributed workflow with the workflow management, the initiating including instantiating multiple work actions each representing an atomic business activity of the distributed workflow related to the document, at least one work action to be performed by a user other than a user that requested opening the document, and initiating a frontend interface on the client device for one of the backend systems and a connection by the client device to a service of the one backend system to perform work related to the document, wherein the distributed workflow uses the document as a resource to perform the work related to the business goal of the associated business scenario; and instantiating the document on the client device in response to the request to open the document including creating an instance of the enterprise data object, wherein the document is opened in a context of the associated business scenario and the distributed workflow initiated in response to the request to open the document.

2. The method of claim 1, wherein receiving the request to open the document comprises:
receiving a request to create the document from a template.

3. The method of claim 1, wherein receiving the request to open the document comprises:
receiving a request to open a form document.

4. The method of claim 1, wherein receiving the request to open the document comprises:
receiving a request to open the document from a business office suite.

5. The method of claim 4, wherein receiving the request to open the document from the business office suite comprises:
receiving a request to open the document via a business process extension of the office suite.

6. The method of claim 1, wherein determining that the document has the associated business scenario comprises:
identifying the associated business scenario via metadata related to the document.

7. The method of claim 1, wherein determining that the document has the associated business scenario comprises:
identifying the associated business scenario via a project context in which the document was instantiated.

8. The method of claim 1, wherein initiating the workflow comprises:
generating a distributed workflow from reusable workflow building block components.

9. The method of claim 8, wherein initiating the distributed workflow comprises:
generating a distributed workflow having requests-to-perform relating the components, wherein each component represents a phase of the distributed workflow in which a work action is to be completed, and wherein transition between phases of the distributed workflow occur by generation of a request by a first performer of the work action for a second performer to perform a second work action.

10. An article of manufacture comprising a machine readable storage medium having content stored thereon to provide instructions to cause a machine to perform operations for presenting a business process, including:

receiving a request to open a document in a client device, the document incorporating at least one data object from the enterprise system, the enterprise system including multiple backend systems accessible via at least one frontend interface on the client device;

processing the request, including identifying one of multiple different business scenarios in the enterprise system associated with the document, wherein
the document is associated with the business scenario and not the other different business scenarios,
the business scenario is defined in reference to resources and services to use to perform work related to a business goal of the business scenario, the resources including the document;

determining in response to the identifying the business scenario, a distributed workflow specific to performing the work related to the business goal of the associated business scenario, the enterprise system including workflow management configured to generate the distributed workflow in response to identifying the business scenario;

initiating the distributed workflow with the workflow management, the initiating including instantiating multiple work actions each representing an atomic business activity of the distributed workflow related to the document, at least one work action to be performed by a user other than a user that requested opening the document, and initiating a frontend interface on the client device for one of the backend systems and a connection by the client device to a service of the one backend system to perform work related to the document, wherein the distributed workflow uses the document as a resource to perform the work related to the business goal of the associated business scenario; and instantiating the document on the client device in response to the request to open the document including creating an instance of the enterprise data object, wherein the document is opened in a context of the associated business scenario and the distributed workflow initiated in response to the request to open the document.

11. The article of manufacture of claim 10, wherein the content to provide instructions for receiving the request to open the document comprises content to provide instructions for
receiving a request to create the document from a template.

12. The article of manufacture of claim 10, wherein the content to provide instructions for initiating the multiple work actions comprises content to provide instructions for
generating the distributed workflow with multiple work actions from reusable workflow building block components stored in and managed by the enterprise system.

13. The article of manufacture of claim 12, wherein the content to provide instructions for generating the distributed workflow comprises content to provide instructions for
generating the distributed workflow with request-to-perform relationships relating the components, wherein each component represents a phase of the distributed workflow in which a work action is to be completed, and wherein transition between phases of the distributed workflow occur by generation of a request by a first performer of the work action for a second performer to perform a second work action.

14. A system comprising:
a database of an enterprise system to store data;
a memory coupled to the database, the memory to load and execute an office suite application from which a request is generated to open a document as an instance of data stored in the database, the document incorporating at least one data object from the enterprise system, the enterprise system including multiple backend systems accessible via at least one frontend interface on the client device, the enterprise system including workflow management configured to generate a distributed workflow specific to performing work related to a business goal of an associated business scenario;
a document instantiation identifier module to identify the request to open the document and determine in response to the request to open the document, that the document has an associated business scenario from among multiple different business scenarios in the enterprise system, the document being associated with the business scenario and not the other different business scenarios, the business scenario defined in reference to resources and services to use to perform work related to a business goal, the resources including the document; and
a workflow generator coupled to the document instantiation identifier module to initiate, in response to the request to open the document, the distributed workflow with the workflow management, the initiating including instantiating multiple work actions each representing an atomic business activity of the distributed workflow related to the document, at least one work action to be performed by a user other than a user that requested opening the document, and the initiating further including initiating a frontend interface on the client device for one of the backend systems and a connection by the client device to a service of the one backend system to perform work related to the document, wherein the distributed workflow uses the document as a resource to perform the work related to the business goal of the associated business scenario, and the workflow generator further to instantiate the document on the client device in response to the request to open the document including create an instance of the enterprise data object, wherein the document is opened in a context of the associated business scenario and the distributed workflow initiated in response to the request to open the document.

15. The system of claim 14, further comprising:
a business process extension to load in the memory to identify the request to open the document from the office suite and enable a connection to the enterprise system from the office suite to trigger the work action.

16. The system of claim 14, wherein the document is instantiated from a document template that includes associated metadata defining a relationship of the document template to the business scenario.

17. The system of claim 16, further comprising:
a context determiner that determines a business context associated with the document template for the business scenario in which the document is instantiated.

18. The system of claim 17, wherein the context determiner is to identify the related business scenario via a project context in which the document template was instantiated.

19. The system of claim 17, wherein the context determiner is to identify from the associated metadata multiple business scenarios related to the instantiated document template; and
select one of the business scenarios based on a project context in which the document template was instantiated.

20. A method for generating a work action associated with a workflow, comprising:
receiving a request from a client device by a server of an enterprise system to open a document in the client device, the document incorporating at least one data object from the enterprise system, the enterprise system including multiple backend systems accessible via at least one frontend interface on the client device;
instantiating a local instance of the document on the client device in response to the request to open the document, including creating an instance of the enterprise data object, the document including at least one field for receiving user input;
identifying a business scenario associated with the document, the business scenario defined in reference to resources and service for a user to use to perform work to fulfill a portion of a distributed workflow managed by the server;
determining that the request from the client device was made outside a context of the business scenario, and outside a context of the distributed workflow;
initiating an instance of the distributed workflow in response to determining that the request was made outside the context of the business scenario, the initiating including instantiating multiple work actions each representing an atomic business activity of the distributed workflow instance;
generating the context of the business scenario on the client device by initiating a frontend interface on the client device to execute one of the multiple work actions with the document instance; and
initiating a connection by the client device to a service of one of the multiple backend systems to perform work on the document instance, including processing data input into the field.

* * * * *